(12) United States Patent
Johnson (10) Patent No.: US 7,542,586 B2
(45) Date of Patent: Jun. 2, 2009

(54) TOUCHLESS IDENTIFICATION SYSTEM FOR MONITORING HAND WASHING OR APPLICATION OF A DISINFECTANT

(76) Inventor: Raymond C. Johnson, 19 Wharton Way Ct., Chesterfield, MO (US) 63017

( * ) Notice: Subject to any disclaimer, the term of this patent is extended or adjusted under 35 U.S.C. 154(b) by 656 days.

(21) Appl. No.: 11/287,658

(22) Filed: Nov. 28, 2005

(65) Prior Publication Data

US 2007/0064986 A1 Mar. 22, 2007

Related U.S. Application Data (63) Continuation-in-part of application No. 10/096,061, filed on Mar. 12, 2002, now Pat. No. 6,970,574.

(60) Provisional application No. 60/275,495, filed on Mar. 13, 2001.

(51) Int. Cl.
*G06K 9/00* (2006.01)
*H04N 7/18* (2006.01)

(52) U.S. Cl. .................. 382/100; 382/107; 348/143

(58) Field of Classification Search .............. 382/100, 382/103, 107, 108, 115, 151, 163, 168, 175, 382/178, 209, 237, 203, 274, 305, 312; 340/573.1; 702/127; 134/57 R, 58 R; 222/1; 356/73; 604/289, 290; 348/143
See application file for complete search history.

(56) References Cited

U.S. PATENT DOCUMENTS

| | | | | |
|---|---|---|---|---|
| 5,202,666 A | * | 4/1993 | Knippscheer | 340/573.1 |
| 5,952,924 A | * | 9/1999 | Evans et al. | 340/573.1 |
| 5,954,069 A | * | 9/1999 | Foster | 134/57 R |
| 5,960,991 A | * | 10/1999 | Ophardt | 222/1 |
| 6,038,331 A | | 3/2000 | Johnson | 382/100 |
| 6,122,042 A | * | 9/2000 | Wunderman et al. | 356/73 |
| 6,236,317 B1 | * | 5/2001 | Cohen et al. | 340/573.1 |
| 6,236,953 B1 | * | 5/2001 | Segal | 702/127 |
| 6,292,575 B1 | * | 9/2001 | Bortolussi et al. | 382/118 |
| 6,375,038 B1 | | 4/2002 | Daansen et al. | 222/52 |
| 6,392,546 B1 | * | 5/2002 | Smith | 340/573.1 |
| 6,426,701 B1 | * | 7/2002 | Levy et al. | 340/573.1 |
| 6,970,574 B1 | | 11/2005 | Johnson | 382/100 |
| 2003/0133614 A1 | | 7/2003 | Robins et al. | 382/219 |
| 2004/0017934 A1 | | 1/2004 | Kocher | 382/125 |
| 2004/0128519 A1 | | 7/2004 | Klinger et al. | 713/186 |
| 2004/0264742 A1 | | 12/2004 | Zhang et al. | 382/115 |
| 2005/0201597 A1 | | 9/2005 | Wendt et al. | 382/125 |
| 2005/0248461 A1 | | 11/2005 | Lane et al. | 340/573.1 |

* cited by examiner

*Primary Examiner*—Seyed Azarian
(74) *Attorney, Agent, or Firm*—Grace J. Fishel (57) ABSTRACT

A system and method for monitoring hand washing or application of a disinfectant wherein a pattern recognition algorithm executed in a computer compares one or more digitized images of a user going through hand washing or disinfectant application motions with a reference set of images and creates a pass/fail report. An input device, digitizer and computer used in monitoring hand washing or application of a disinfectant may also be used as part of a touchless identification system to authenticate the user wherein an image processing algorithm and a mathematical algorithm executed in the computer identifies the user based on data extracted from the user's digitized hand images.

16 Claims, 5 Drawing Sheets

TOUCHLESS IDENTIFICATION SYSTEM FOR MONITORING HAND WASHING OR APPLICATION OF A DISINFECTANT

The present application is a continuation-in-part of U.S. application Ser. No. 10/096,061, filed Mar. 12, 2002, for Pattern Recognition System and Method for Monitoring Hand Washing or Application of a Disinfectant, issued Nov. 29, 2005 as U.S. Pat. No. 6,970,574, which claims priority from provisional patent application 60/275,495, filed Mar. 13, 2001 which is incorporated by reference herein.

BACKGROUND OF THE INVENTION

1. Field of the Invention

The present invention relates to a touchless system for recognizing an individual. The touchless system may be used in connection with a system and method for monitoring hand washing or the application of a disinfectant to a user's hands through pattern recognition.

2. Brief Description of the Prior Art

In food service, food packing plants, medical care facilities and so forth, it is essential that the employee wash his or her hands properly and/or apply a disinfectant to prevent the spread of disease. The movements necessary to apply soap and wash one's hands or to apply a disinfectant and spread it on one's hands are well known, but ensuring that each employee practices them consistently continues to be a management problem.

In addition to monitoring that hand washing or disinfectant application has been correctly done, it would be desirable to have a touchless method of identifying the employee to avoid passing germs and other substances from one person to the next through contacting the same surface such as a card reader, box-type hand recognition system or the like. It would be an added bonus if the equipment used for monitoring hand washing or disinfectant application could also be used for employee identification.

U.S. Pat. No. 6,038,331 to Johnson for Apparatus and Method for Monitoring Hand Washing describes an effective system for monitoring the application of soap to a subject's hands. The present invention is an extension of the apparatus and systems described therein.

The following references are incorporated by reference herein: U.S. Pat. Nos. 6,038,331, 6,122,042 and 6,292,575; "Unsupervised Segmentation of Color-Texture Regions in Images and Video," Y. Deng and B. S. Manjunath; "Texture Classification Using Dual-Tree Complex Wavelet Transform," S. Hatipoglu, S. K. Mitra and N. Kingsbury, *Image Processing and Its Applications*, IEEE Conference Publication No. 465, 1999, 344-347; and "Unsupervised Segmentation of Color Images Based on k-means Clustering in the Chromaticity Plane," L. Lucchese and S. K. Mitra, 1999 IEEE, 74-78.

BRIEF SUMMARY OF THE INVENTION

In view of the above, it is an object of the present invention to provide a system and method for effectively monitoring whether hand washing and disinfectant application procedures are being practiced. It is another object to provide management with a report on its employees as to whether proper hand washing and disinfectant application procedures are being followed and to sound an immediate alert if desired, if they are not. Another object is to provide a touchless identification system to authenticate the identity of the user which makes use of portions of the hand washing and disinfectant monitoring system. Other objects and features of the invention will be in part apparent and in part pointed out hereinafter.

In accordance with the invention, a system for monitoring hand washing or spreading a disinfectant on a user's hands comprises:

a soap, detergent or disinfectant dispenser, said dispenser applying the soap, detergent or disinfectant to a user's hands, an input device in front of which a user places his or her hands after the dispenser has applied soap, detergent or disinfectant while the user goes through a set of motions of washing or spreading the disinfectant over his or her hands, said input device recording one or more images of the user's hands while he or she is going through said set of motions, a device for digitizing the images into a digitized image, a computer having an input for the digitized image and an output for a report, a set of reference images taken of the user or of another person going through a set of motions for effective hand washing or spreading of a disinfectant, said reference images digitized into a set of reference digitized images and present in the computer, a pattern recognition algorithm executed in the computer that compares each digitized image of the user's hands with the reference set of digitized images to determine whether the user's images match the reference images to a predetermined level that indicates effective hand washing or disinfectant spreading, and creates a report sent through the output.

A method for monitoring hand washing or spreading a disinfectant on a user's hands comprises:

having a user place his or her hands in front of a soap, detergent or disinfectant dispenser, said dispenser applying the soap, detergent or disinfectant to the user's hands, having the user place his or her hands in front of an input device after the dispenser has applied soap, detergent or disinfectant while the user goes through a set of motions of washing or spreading the disinfectant over his or her hands, said input device recording one or more images of the user's hands while he or she is going through said set of motions, digitizing each of the images into a digitized image, executing a pattern recognition algorithm in a computer having an input for the digitized image and an output for a report, said computer having a digitized set of reference images taken of the user or of another person going through a set of motions for effective hand washing or spreading of a disinfectant, said pattern recognition algorithm comparing each digitized image of the user's hands with the reference set of digitized images to determine whether the user's images match the reference images to a predetermined level that indicates effective hand washing or disinfectant spreading and creating a report sent through the output.

A touchless identification system may be provided as an integral portion of the hand washing and disinfectant monitoring system and make use of the input device, digitizer and computer used in the hand washing and disinfectant monitoring system. In the touchless identification system, a user places at least one of his or her hands in front of the input device, the images are digitized and supplied to the computer. The computer is programmed with an image processing algorithm that extracts the person's hand images from the digitized images and with an a mathematical algorithm for identifying the person based on data extracted from the digitized images.

The mathematical algorithm for identifying the person in the touchless identification system may take various forms. For example it may include a first algorithm for normalizing the hand images and generating minutia data points and a second algorithm for comparing the minutia data points with a reference set of minutia data points for the person's hands taken at enrollment in the system. The computer is programmed with a second mathematical algorithm for determining whether there is a sufficient match to authenticate the identity of the user. Alternatively, the mathematical algorithm for identifying the user may decode secret hand signals made in the camera space of the input device or interpret movements of the user's hands as key presses inputting an identification code on a phantom keyboard.

The invention summarized above comprises the systems and methods hereinafter described, the scope of the invention being indicated by the subjoined claims.

DETAILED DESCRIPTION OF THE INVENTION

For management purposes, it is important that an employer be assured that its employees are following proper procedures in hand washing and/or applying a disinfectant. There are systems that can identify an employee when he or she presents his or her hands under a soap, detergent or disinfectant dispenser, but this does not assure the employer that the employee will scrub his or her hands or spread the disinfectant in a proper manner. Previous systems make use of separate employee identifying detectors such as a bar code, an ID that can be read with a radio frequency transponder, face recognition systems and the like. While the motions necessary for proper hand washing and disinfectant spreading are known and can be taught, it is not presently feasible for management to determine that the procedures are actually being followed. The present invention provides management with a system and method for determining that the proper techniques are practiced, components of which may also be used to identify the person.

Figure 1:
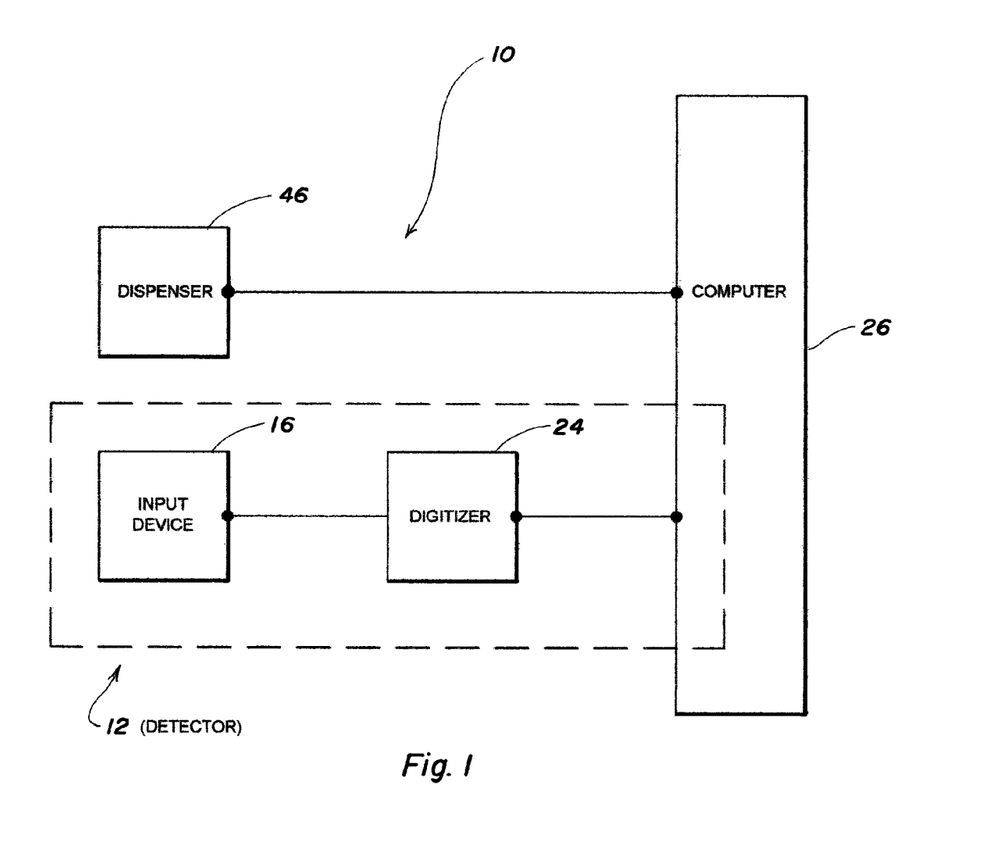
FIG. 1 is a schematic drawing of a system for practicing a method of identifying a user and monitoring hand washing or disinfectant application in accordance with the present invention.

Referring to FIG. 1 more particularly by reference character, reference number 10 refers to a system for monitoring hand washing in combination with a touchless detector 12 for identifying a user. Detector 12 is generally used under circumstances requiring a one-to-one authentication match as opposed to a one-to-many identity match. Varying images and near-fit matches are sufficient to distinguish the employees of most businesses because the number of employees is usually a relatively small number. In addition, occasionally misidentifying an employee is not likely to have dire consequences.

Figure 2:
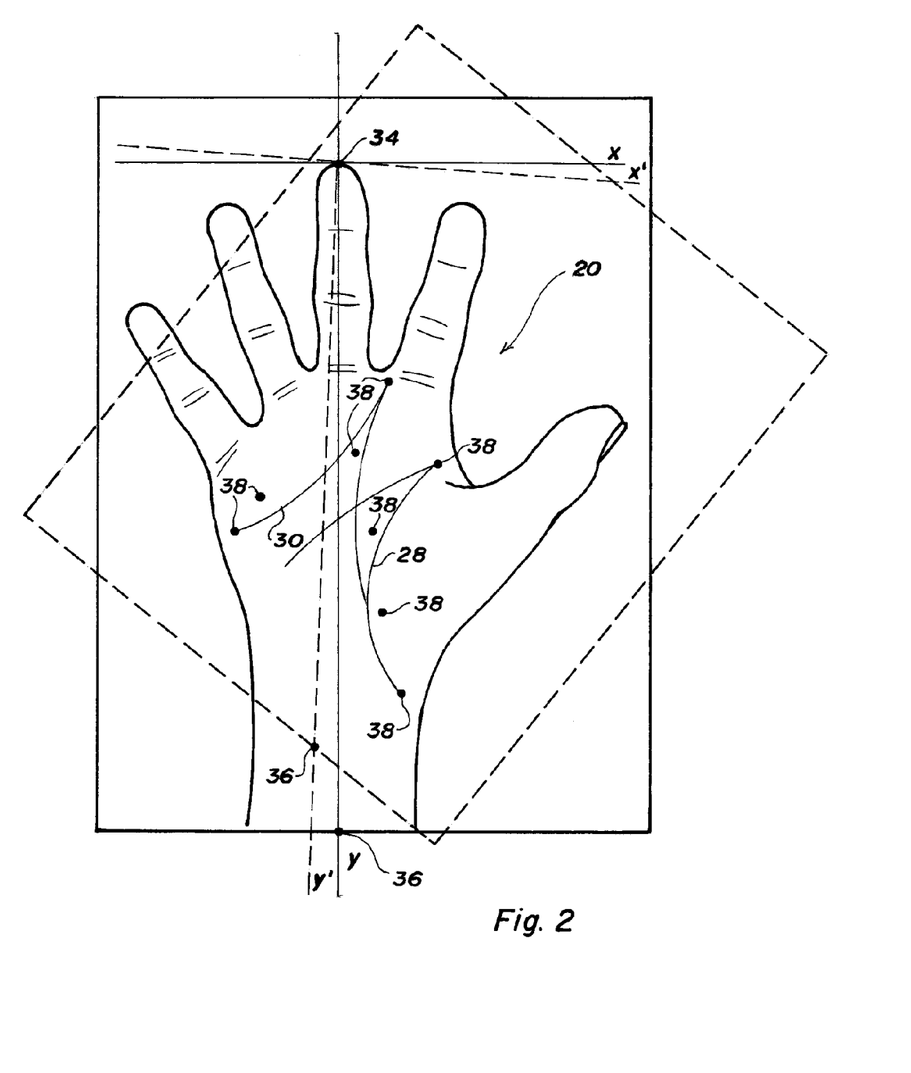
FIG. 2 is a plan view of a palm isolated from the background and showing observable features in connection with Cartesian coordinate systems X,Y and X',Y'.
Figure 3:
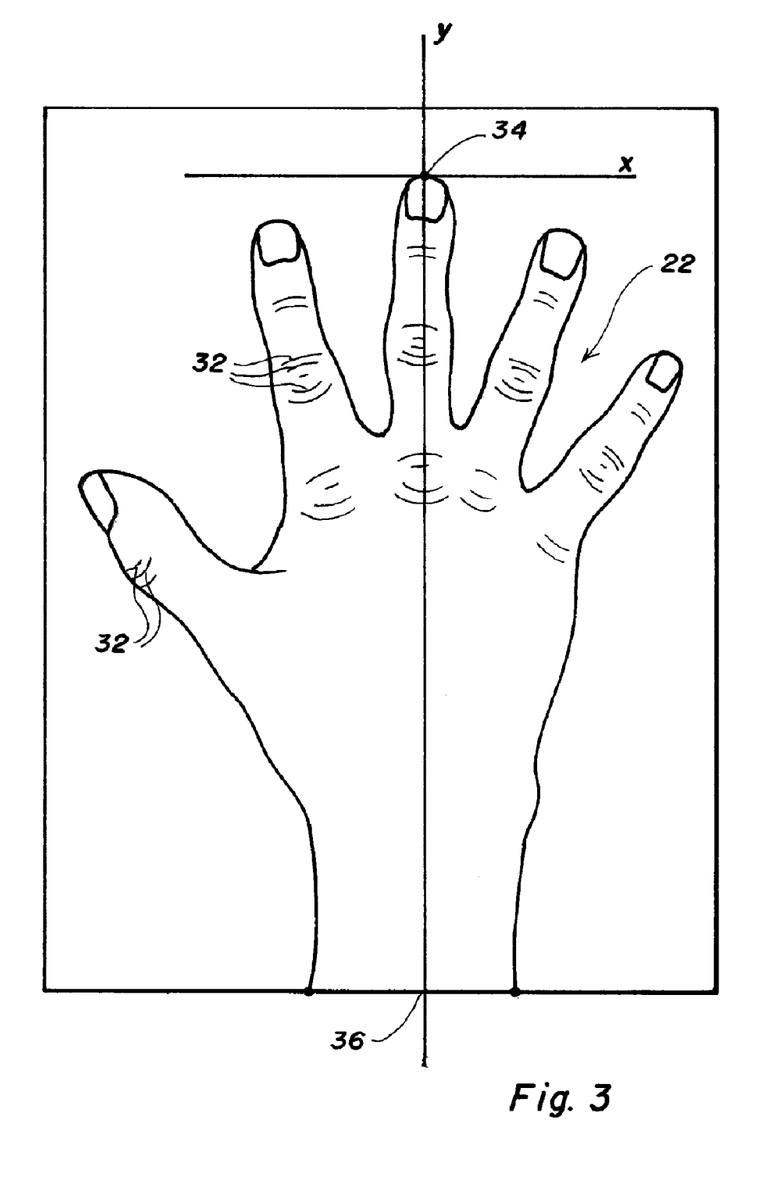
FIG. 3 is a plan view of a back of the hand isolated from the background and showing observable features in connection with Cartesian coordinate system X,Y.
Figure 4:
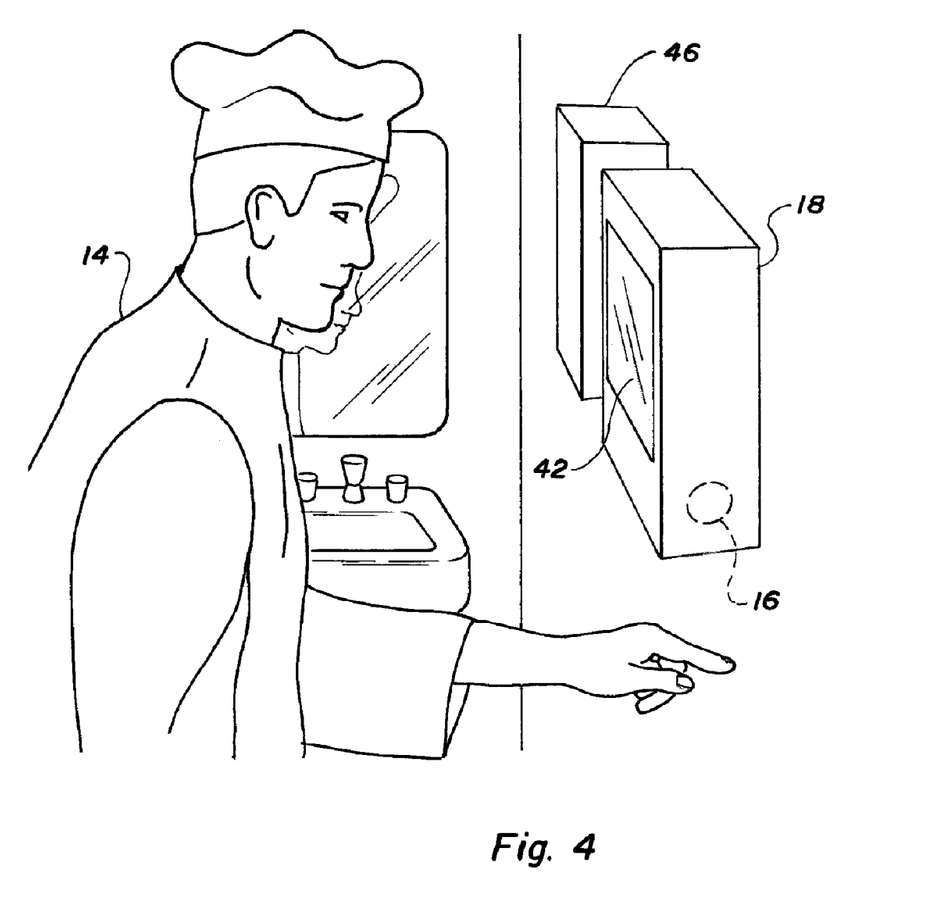
FIG. 4 is a perspective view of a user approaching a system for touchless hand recognition and monitoring hand washing or application of a disinfectant; and, FIG. 5 is a elevational view of a video monitor showing a keyboard overlay and a user's hand in a region watched by an input device making a key press on a phantom keyboard.

When an employee 14 enters a room as shown in FIG. 4, he or she presents one or more of his hands to an optical input device 16 which may be housed in a cabinet 18. Optical input device 16 records optical images of a front 20 or back 22 of the user's hand or hands as shown in FIGS. 2 and 3. Referring back to FIG. 1, the optical images are supplied to a device for digitizing 24 selected ones of the optical images into digitized images. Device for digitizing 24 may be a separate or an integral part of a computer 26 and may be housed in cabinet 18 or separately. Input device 16 may be a video camera such as a monochrome camera, a full color camera, or a camera sensitive to nonvisible portions of the spectrum. Images may be a set of grab frames. Input device 16 may also include a plurality of cameras for generating a three-dimensional image or a single camera with different objectives or filters for recording an image at different wavelengths, e.g., visible, IR or UV. Input device 16 may be a laser scanner which allows for three-dimensional surface acquisition. Input device 16 may be visible to the user or hidden behind a one-way mirror or the like.

Computer 26 is programmed with an image processing algorithm that extracts the user's hand images from the digitized images and with a mathematical algorithm for identifying the person based on data extracted from the digitized images. A Sobel edge detector, Laplacian edge detector, Canny edge detector, Bergholm edge detector, etc. may be used extract the hand images from the background.

If the user's hand is not correctly positioned in the digitized images, computer 26 may be programmed to alert the user to readjust the position of his hands. A hand that is too clenched will show a distinct shadow around the fingers. If the amount of shadow exceeds a certain heuristic, the image may be rejected and the user alerted to readjust the position of his hands. A hand that is too stretched open will not distinctly show hand line detail. If the visual strength of the hand lines for example as deduced from the Sobel operator process is insufficient, the image may be rejected and the user alerted to readjust the position of his hands. A hand that is too tilted will show a distinct shadow across the hand. If the amount of shadow exceeds a certain heuristic, the image may be rejected and the user alerted to readjust the position of his hands.

After the images have been accepted and digitized, identification of the person may be accomplished in a number of different ways. For example computer 26 may be programmed with a first mathematical algorithm that applies a Cartesian coordinate system X,Y to normalize the hand image and generates a mathematical approximation of observable hand features on the front or back of the hand. A life line 28, heart line 30, etc. as shown in FIG. 2 or knuckle lines 32 as shown in FIG. 3 as well as freckles, veins, finger proportions, and other distinctive features are sufficient to distinguish among employees in most instances. The Cartesian coordinate system X,Y shown in FIG. 2 in full lines is positioned with respect to selected features in the hand images serving as reference points. For example the Y axis may pass through a tip 34 of the middle finger and a midpoint 36 of the wrist where it meets the bottom of the picture. The X axis may be orthogonal to the Y axis and pass through tip 34 of the middle finger. It will be readily apparent that Cartesian coordinate system X,Y may be referenced to other features if desired. The mathematic approximation of the observable hand features may be calculated with a spline formula such as a Bezier curve of a selected order, for example two or three, a LaGrange formula and so forth. The mathematical approximation is supplied in the form of minutia data points 38 referenced in the grid formed by the Cartesian coordinate system X,Y.

When employee 14 is enrolled in the system, a reference set of minutia data points identified as those of the employee are stored in a database in computer 26. Subsequently, when employee 14 presents him- or herself for identification, a second set of minutia data points are determined. At the time of enrollment, the user's hands may be at a slightly different angle with respect to optical input device 16 such that Cartesian coordinate system X',Y' shown in broken lines in FIG. 2 will be offset from Cartesian coordinate system X,Y. The amount of offset, however, may be controlled by mounting optical input device 14 in cabinet 18 as shown in FIG. 4 such that the user cannot approach from the rear and is discouraged from approaching from the sides. When the user's hands are at a slightly different angle with respect to optical input device 16, identical data points 38 will map slightly differently in the two coordinate systems as shown in FIG. 2. Computer 26 may therefore be programmed with a second mathematical algorithm that compares minutia data points 38 on the X,Y grid with minutia data points 38 on the X',Y' grid taken at enrollment and determine a percentage of match. The degree of match required to distinguish a given population of employees may be determined heuristically. An output signal from computer 26 is then produced when the match percentage exceeds a set threshold and a different output signal when the match does not exceed the set threshold, the output signals creating an identification report.

In comparing data points 38 on the X',Y' grid to the data points on the X,Y grid, database queries may be performed requesting matches for the most common hand lines which are also present in the current hand model. Database queries may be performed requesting Bezier path matches within a certain range. Database queries may be performed requesting matches for Bezier path relationships indicating local affinity. If no matches are found, the user has not been authenticated. If pre-determined heuristics suggest a sufficient match, the user is authenticated as that match. If more than one person is returned by the database queries, the match chosen is that which the heuristic determines is closest.

Other ways of identifying the person by comparing the digitized images with a reference set of images taken at enrollment may be used. For example, identification of the person may be accomplished wherein the mathematical algorithm compares the digitized images with a database containing a reference set of digitized images of the person's hand or hands making a secret sign at enrollment in the system. The secret sign may be a personal identification number (PIN) formed by holding out fingers. As an illustration, if the employee's pin ID is 4617, it could be signaled by holding out four fingers, then six, then one and then seven. If the employee's PIN is a sequence of letters such as abc, the employee could hold out the deaf alphabet symbols a, then b and then c. Made-up, alternate symbols may also be used.

Figure 5:
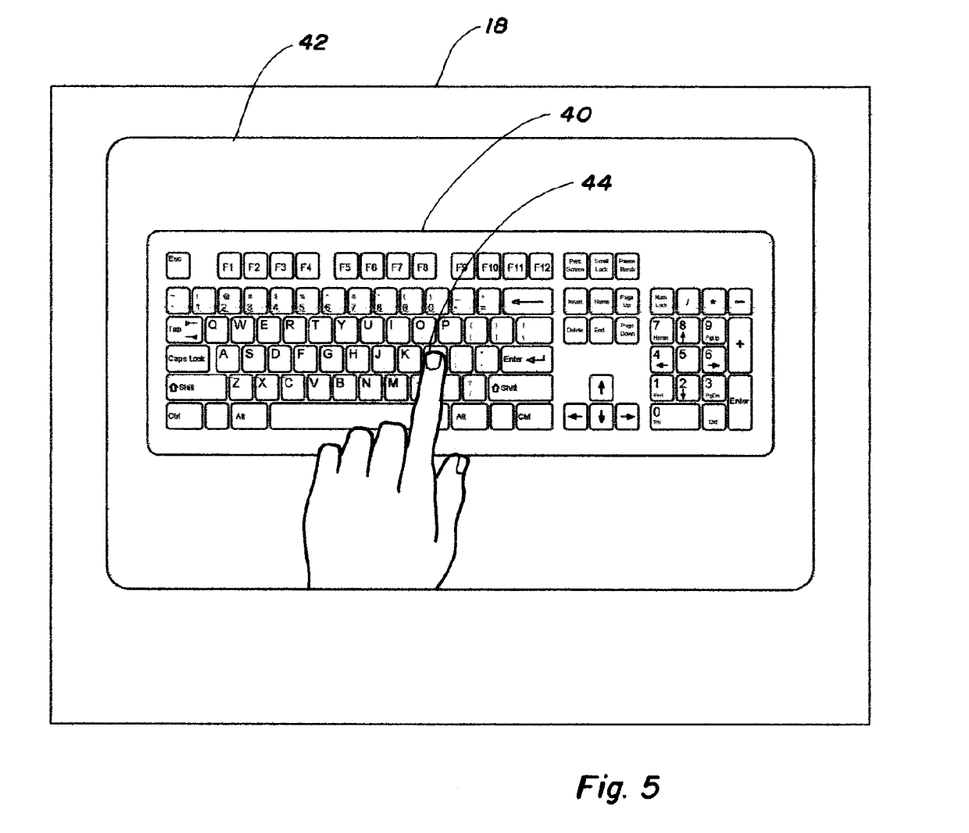

Identification of the person may also be accomplished by typing on a phantom keyboard which appears as overlay 40 in a video monitor 42. Video monitor 42 may be housed in cabinet 18 and overlay 40 activated when a motion-detection algorithm determines a sufficient change in a certain region of the camera space. When the user's hand enters a region watched by input device 16, video monitor 42 displays what input device 16 sees superimposed on keyboard overlay 40. A grid defined by the positions of the keys in the camera space spans the screen and identifies where each key position is laid. Using overlay 40, the user can direct his or her index finger to a key 44 in the virtual space. Using a skin tone color identifier combined with a Sobel edge detector for example, the outline of a human finger can be determined. If the tip of a finger determined by the endpoint of the edge-bounded finger-space is found to be dormant for a preset amount of time, the fingertip's grid position is identified. The key that corresponds to the grid position is emulated as a key press. If no key corresponds to the grid position, no event is performed. User 14 may thus enter his name, employee identification number, etc.

In system 10, after user 14 has entered the room and been identified or not, detector 12 sends a signal to computer 26. A dispenser 46 applies soap, detergent or disinfectant to the user's hands. Dispenser 46 may be touchless and have a proximity detector such that the soap, detergent or disinfectant is dispensed on the user's hands when they are within range. If the user is not an employee (i.e., not identified by the computer), the process may continue but a report may or may not be made to management on the anonymous user.

Computer 26 has a reference set of digitized images of a person going through a set of motions predetermined to be effective for proper hand washing or disinfecting of the person's hands. The images may be held in the computer as a number of freeze frames of model stages in hand washing. This will allow management to choose nail cleaning, for example if it desires, as part of a proper sequence. The reference set of images may be made from optical or thermal images of the user whose activity is to be monitored going through the proper motions or of some other person demonstrating the proper technique.

To obtain a passing report from computer 26, the user must place his or her hands in front of input device 16 after the soap, detergent or disinfectant has been applied and go through the motions of hand washing or spreading the disinfectant. Input device 16 records one or more optical images of the user's hands while he or she is going through the set of motions. These images are then digitized by digitizing device 24 and provided to computer 26.

Computer 26 is programmed with a pattern recognition algorithm which is executed in the computer that compares the digitized images of the user's hands with the reference set of digitized images. The algorithm may include motion detector software capable of detecting differences between successive grab frames indicating movement. It will also be understood that the invention may make use of trained pattern recognition technologies such as neural networks. Trained pattern recognition systems may require less computing power and permit the use of lower cost microprocessors because the resulting algorithm created by a neural network program may be only a few lines of code.

The reference feature being compared in the computer may be color. When optical input device is a 24-bit RGB (red, green, blue) video camera, the color of each pixel is defined by intensities of the red, green and blue components in the range 0 to 255. To reduce the amount of computing power required, the pixels may be color quantified into a more manageable set of 8 to 50 color classes. Each class includes a range of colors defined by the intensities of the red, green and blue components. Once color quantification has been performed, clusters of pixels with similar color classifications may be determined and shapes identified.

Each similarly colored cluster may also be analyzed for texture. For this purpose, the original RGB values may be used as the results of color quantification may not be accurate enough. Regions or clusters of pixels with similar color classifications may be determined and compared to identify and distinguish the texture of hands from hands on which soap, alcohol or some other chemical has been applied.

A predetermined level of matching between the digitized images and the reference images indicates that effective hand washing or disinfectant spreading has occurred. After executing the algorithm on the digitized optical images of the user, computer 14 creates a report sent through the output. All of these events must be performed in near real-time in order to not hamper employee productivity. The report may or may not be displayed to the user either verbally or visually.

The output can be a written pass/fail report provided to the employer or an audible alert. System 10 can automatically call out the name of the employee when it determines that he or she has failed to wash or disinfect his or her hands or give a simple alarm. For instance if an employee is working at the cash register of a fast food restaurant and then begins working in the food preparation area, the system can call out "John Smith please disinfect your hands." If the user is not an employee, no report need be made, unless desired by management.

The present system and method can be used to monitor hand washing. If the employee is required to disinfect his hands after washing them, this can be monitored also. In addition, the present system and method can be used to monitor a stand alone disinfectant spray system where sinks are not available but disinfectants are desirable, as in the entry or exit of some hospital rooms.

In view of the above, it will be seen that the several objects of the invention are achieved and other advantageous results attained. As various changes could be made in the above systems and methods without departing from the scope of the invention, it is intended that all matter contained in the above description or shown in the accompanying drawings shall be interpreted as illustrative and not in a limiting sense.

What is claimed:

1. A system for monitoring hand washing or spreading a disinfectant on a user's hands comprising
    a soap, detergent or disinfectant dispenser for applying soap, detergent or disinfectant to a user's hands,
    an input device in front of which a user places his or her hands after the dispenser has applied soap, detergent or disinfectant while the user goes through a set of motions of washing or spreading the disinfectant over his or her hands, said input device recording one or more images of the user's hands while he or she is going through said set of motions,
    a device for digitizing the images into digitized images,
    a computer having an input for the digitized images and an output for a report,
    a set of reference images taken of the user or of another person going through a set of motions for effective hand washing or spreading of a disinfectant, said reference images digitized into a set of reference digitized images and present in the computer,
    a pattern recognition algorithm executed in the computer that compares the digitized images of the user's hands with the reference set of digitized images to determine whether the user's images match the reference images to a predetermined level that indicates effective hand washing or disinfectant spreading, and creates a compliance report sent through the output,
    said system further comprising a touchless hand recognition system for identifying the user before applying soap, detergent or disinfectant wherein he or she places at least one of his or her hands in front of the input device, said input device recording one or more images of the user's hand or hands,
    said device for digitizing selected ones of the images into digitized images inputting them into the computer,
    said computer having an image processing algorithm executed in the computer that extracts said user's hand images from said digitized images, and
    a mathematical algorithm executed in the computer for identifying the user based on data extracted from said digitized images.

2. The system of claim 1 wherein a first portion of the mathematical algorithm executed in the computer in the touchless hand recognition system applies a Cartesian coordinate system to the hand images and generates a mathematical approximation of observable hand features in the form of minutia data points referenced in said Cartesian coordinate system, said Cartesian coordinate system positioned with respect to selected features in the hand images serving as reference points,
    a second portion of the mathematical algorithm executed in the computer in the touchless hand recognition system compares the minutia data points with a database containing a reference set of minutia data points for the user's hand or hands taken at enrollment in the system and determines a percentage of match;
    an output signal from said computer which is produced when said match percentage exceeds a set threshold and a different output signal when said match does not exceed said set threshold, said output signals creating an identification report.

3. The system of claim 1 wherein the mathematical algorithm compares the digitized images with a database containing a reference set of digitized images of the user's hand or hands making a secret sign at enrollment in the system and determines a percentage of match,
    an output signal from said computer which is produced when said match percentage exceeds a set threshold and a different output signal when said match does not exceed said set threshold, said output signals creating an identification report.

4. The system of claim 3 wherein the secret sign is a personal identification number formed by holding out fingers.

5. The system of claim 1 wherein the input device is connected to a video monitor in view of the user and wherein the mathematical algorithm compares the digitized images with a database containing a reference set of digitized images of the user's hand or hands typing a secret code on a virtual keyboard seen in the video monitor and determines a percentage of match,
    an output signal from said computer which is produced when said match percentage exceeds a set threshold and a different output signal when said match does not exceed said set threshold, said output signals creating an identification report.

6. The system of claim 1 wherein the image processing algorithm is an edge detecting algorithm.

7. The system of claim 1 wherein the image processing algorithm is a Sobel edge detector.

8. The system of claim 1 wherein the image processing algorithm is a Laplacian edge detector.

9. The system of claim 1 wherein the image processing algorithm is a Canny edge detector.

10. The system of claim 1 wherein the image processing algorithm is a Bergholm edge detector.

11. The system of claim 1 wherein the mathematic approximation of observable hand features is a Bezier curve of a selected order.

12. A method for monitoring hand washing or spreading a disinfectant on a user's hands comprising
    having a user place his or her hands in front of a soap, detergent or disinfectant dispenser for applying a soap, detergent or disinfectant to the user's hands,
    having the user place his or her hands in front of an input device after the dispenser has applied soap, detergent or disinfectant while the user goes through a set of motions of washing or spreading the disinfectant over his or her hands, said input device recording one or more images of the user's hands while he or she is going through said set of motions, digitizing the images into digitized images, executing a pattern recognition algorithm in a computer having an input for the digitized images and an output for a report, said computer having a digitized set of reference images taken of the user or of another person going through a set of motions for effective hand washing or spreading of a disinfectant, said pattern recognition algorithm comparing the digitized images of the user's hands with the reference set of digitized images to determine whether the user's images match the reference images to a predetermined level that indicates effective hand washing or disinfectant spreading and creating a report sent through the output, said method further comprising a touchless hand recognition method for identifying the user before he or she approaches the soap, detergent or disinfectant dispenser comprising placing at least one of his or her hands in front of the input device, said input device recording images of the user's hand or hands, digitizing selected ones of the images into digitized images inputting them into the computer, executing an image processing algorithm in the computer that extracts said user's hand images from said digitized images, executing a mathematical algorithm in the computer that applies a Cartesian coordinate system to the hand images and generates a mathematical approximation of observable hand features in the form of minutia data points referenced in said Cartesian coordinate system, said Cartesian coordinate system positioned with respect to selected features in the hand images serving as reference points, executing a mathematical algorithm in the computer that compares the minutia data points with a database containing a reference set of minutia data points for the user's hand or hands taken at enrollment in the system and determines a percentage of match, an output signal from said computer which is produced when said match percentage exceeds a set threshold and a different output signal when said match does not exceed said set threshold, said output signals creating an identification report.

13. The method of claim 12 wherein a first portion of the mathematical algorithm executed in the computer in the touchless hand recognition system applies a Cartesian coordinate system to the hand images and generates a mathematical approximation of observable hand features in the form of minutia data points referenced in said Cartesian coordinate system, said Cartesian coordinate system positioned with respect to selected features in the hand images serving as reference points, a second portion of the mathematical algorithm executed in the computer in the touchless hand recognition system compares the minutia data points with a database containing a reference set of minutia data points for the user's hand or hands taken at enrollment in the system and determines a percentage of match;

an output signal from said computer which is produced when said match percentage exceeds a set threshold and a different output signal when said match does not exceed said set threshold, said output signals creating an identification report.

14. The system of claim 12 wherein the mathematical algorithm compares the digitized images with a database containing a reference set of digitized images of the user's hand or hands making a secret sign at enrollment in the system and determines a percentage of match, an output signal from said computer which is produced when said match percentage exceeds a set threshold and a different output signal when said match does not exceed said set threshold, said output signals creating an identification report.

15. The system of claim 14 wherein the secret sign is a personal identification number formed by holding out fingers.

16. The system of claim 12 wherein the input device is connected to a video monitor in view of the user and wherein the mathematical algorithm compares the digitized images with a database containing a reference set of digitized images of the user's hand or hands typing a secret code on a virtual keyboard seen in the video monitor and determines a percentage of match, an output signal from said computer which is produced when said match percentage exceeds a set threshold and a different output signal when said match does not exceed said set threshold, said output signals creating an identification report.

* * * * *